(12) United States Patent
Klawinski

(10) Patent No.: US 10,120,393 B1
(45) Date of Patent: Nov. 6, 2018

(54) PIVOT MONITOR AND CONTROLLER

(71) Applicant: Brian Klawinski, Magnolia, TX (US)

(72) Inventor: Brian Klawinski, Magnolia, TX (US)

( * ) Notice: Subject to any disclaimer, the term of this patent is extended or adjusted under 35 U.S.C. 154(b) by 558 days.

(21) Appl. No.: 14/634,413

(22) Filed: Feb. 27, 2015

(51) Int. Cl.
*A01G 25/16* (2006.01)
*G05D 7/06* (2006.01)
*G05B 19/042* (2006.01)

(52) U.S. Cl.
CPC ........... *G05D 7/0623* (2013.01); *A01G 25/16* (2013.01); *G05B 19/0428* (2013.01); *G05B 2219/2625* (2013.01)

(58) Field of Classification Search
CPC .... A01G 25/092; A01G 25/16; G05D 7/0623; G05B 19/0428; G05B 2219/2625
USPC ............... 239/61; 700/282–284, 304; 701/50
See application file for complete search history.

(56) References Cited

U.S. PATENT DOCUMENTS

| | | | | |
|---|---|---|---|---|
| 3,979,062 A * | 9/1976 | Christensen | ......... | A01G 25/092 239/11 |
| 4,063,569 A * | 12/1977 | Olson | ................. | A01G 25/092 239/1 |
| 4,277,023 A * | 7/1981 | Anderson | ............ | A01G 25/092 239/11 |
| 4,763,836 A * | 8/1988 | Lyle | ........................ | A01G 25/09 239/243 |
| 5,246,164 A * | 9/1993 | McCann | .............. | A01B 79/005 239/11 |
| 6,138,928 A * | 10/2000 | LaRue | ................. | A01G 25/092 137/624.13 |
| 8,317,114 B1 * | 11/2012 | Malsam | ............... | A01G 25/092 239/729 |
| 2010/0274398 A1 * | 10/2010 | Choat | .................... | A01G 25/16 700/284 |
| 2012/0053776 A1 * | 3/2012 | Malsam | ............... | A01G 25/092 701/27 |
| 2014/0110498 A1 * | 4/2014 | Nelson | ................. | A01G 25/092 239/69 |

* cited by examiner

*Primary Examiner* — Darren W Gorman
*Assistant Examiner* — Juan C Barrera

(57) ABSTRACT

An improved pivot monitor is described that allows for adjusting the speed of a center pivot at a field edge without requiring the use of multiple speed tables. Specifically, an improved pivot monitor is described that utilizes a distance from edge and adjustment factor to implement different approach and exit speeds of a center pivot at a field edge. Additionally, the improved pivot monitor is capable of limiting the adjustments within a specified speed limit.

8 Claims, 5 Drawing Sheets

PIVOT MONITOR AND CONTROLLER

BACKGROUND OF THE INVENTION

1. Field of The Invention

The present invention relates generally to the field of agricultural equipment, and particularly to pivot monitors and controllers for center pivots.

2. Description of the Related Art

Center pivots are commonly used to irrigate large ureas of land that are typically a half mile on each side or quarter section. The center pivot includes a base that is attached to the ground and number of segments attached together that are supported on wheels for allowing them to rotate around the base. With the advance in technology, remote telemetry units to monitor pivots and control their functionality are becoming more common. A remote telemetry unit on a center pivot is commonly referred to as a pivot monitor.

Pivot monitors are typically installed in the main panel or at the end tower of a center pivot. Installing a pivot monitor at the end tower allows the unit to include a GPS receiver to determine the hearing of a pivot in a field. A unit installed in a main panel may rely on dead reckoning to determine the pivot bearing, but much less accurately than a GPS unit. The bearing of the pivot may be used to apply watering prescriptions or to control end gun zones.

Watering prescriptions for a center pivot are based on factors such as soil type, terrain, and historical yield data. The watering prescription alters a set application rate to be higher or lower depending on if a region covered by the field needs more or less water. Applying a watering prescription uses the speed control feature of a pivot monitor.

Certain irrigated fields have center pivots that cannot make a complete circle. These types of center pivots are called wiper pivots due to the resemblance in path of a windshield wiper. When a wiper center pivot approaches the edge of the field it is desirable in some circumstances to approach the edge of the field at one speed and leave at a different speed. Typically, an operator would want to approach the field edge at a higher rate and leave at a slower rate to prevent the pivot tire tracks from becoming unnecessarily deep.

Current center pivot controllers accomplish the differing approach and exit speeds by using two speed tables. One table is used to control the speed in the forward direction and the other is used to control the speed in the reverse direction. The limitation of this method is that it requires additional user setup, is prone to entry error, and consumes twice the memory in the pivot controller. Speed tables for center pivots may include several hundred rows of data, which is significant for the types of microcontrollers used in pivot monitors. Therefore, there is a need for a pivot monitor that can easily adjust the speed of a wiper pivot in an easier and more memory efficient manner.

BRIEF DESCRIPTION OF THE DRAWINGS

This invention is described in a preferred embodiment in the following description with reference to the drawings, in which like numbers represent, the same or similar elements, as follows.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

When referring to the location of a center pivot, the location is the position of the end tower of the center pivot or the farthest most extension of the pivot pipe away from the pivot base.

The location of a center pivot is obtained with s position sensor. While referring to GPS coordinates md devices in conjunction with the figures, those familiar with the art will recognize that other types of position sensors may be utilized. For instance, an encoder type position sensor may be utilized to calculate the location of a center pivot.

A processor refers to a single computation device or multiple computational devices working together.

A field edge may be either a physical edge or an edge created by the operator. In some circumstance with different crops on a single field an operator may wish to define an edge between the crops.

In the context of this application, a center pivot shall be interpreted to include a lateral pivot since the present invention is equally applicable to both.

Figure 1:
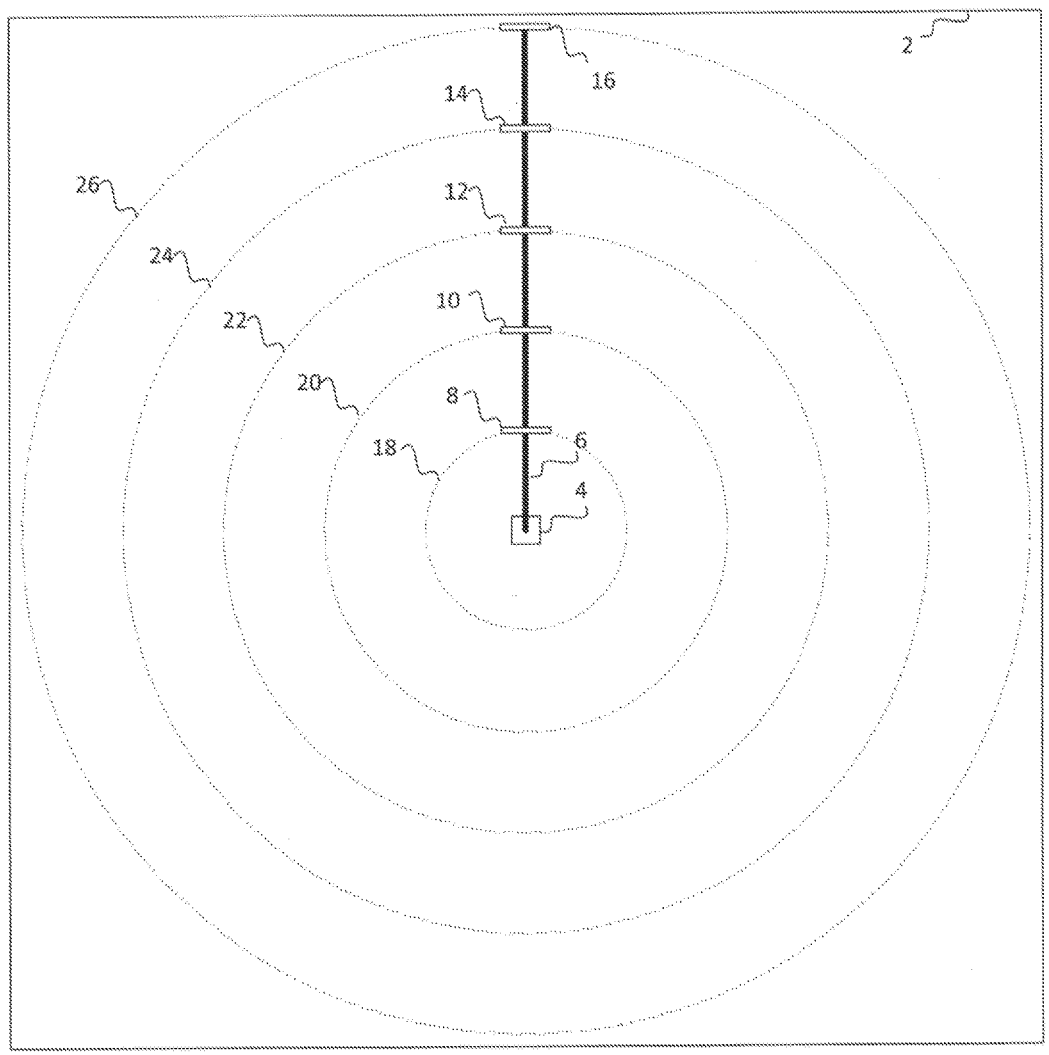
FIG. 1 is a schematic of center pivot.

With reference now to the figures, and in particular with reference to FIG. 1. there is shown an overhead schematic of a center pivot. Censer Pivot Base 4 is located near the center of Growing Field 2. The common size of a growing field is one half mile by one half mile; however, the size of a growing field may vary widely. Center Pivot Base 4 is attached to the ground and includes a rotation mechanism (not shown) that connects to Pivot Pipe 6.

Pivot Pipe 6 is supported by Intermediate Tower 8, 10, 12, and 14. Intermediate Towers 8, 10, 12, and 14 include wheels for allowing tangential movement with respect to Center Pivot Base 4. Paths 18, 20, 22, and 24 show the travel path of Intermediate Towers 8, 10, 12, and 14, respectively, as they travel around Growing Field 2. Intermediate Towers 8, 10, 12, and 14 may travel in either clockwise or counter-clockwise direction. Those familiar with the art common refer to clockwise direction as travelling forward and counter-clockwise as travelling in reverse.

Pivot Pipe 6 terminates at End Tower 16. End Tower 16 is similar to Intermediate Towers 8, 10, 12, and 14. In some instances, End Tower 16 may extend Pivot Pipe 6 to further without any additional ground support and include an end gun (not shown) for watering the corners of Growing Field 2.

Figure 2:
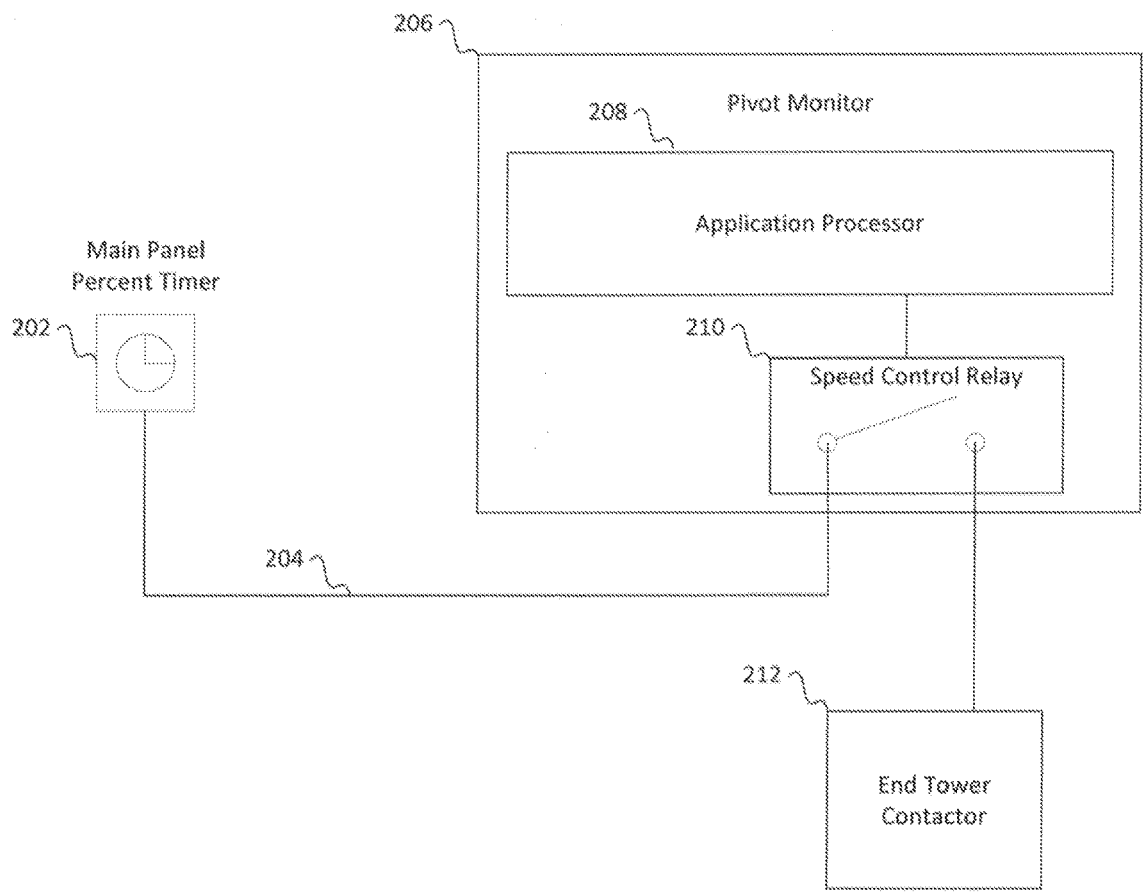
FIG. 2 illustrates the prior art electrical schematic for implementing center pivot speed control with a pivot monitor.

With referenced now to FIG. 2, a block diagram of a prior art pivot monitor with speed control is illustrated. Pivot Base 4 comprises an electrical panel with Main Panel Percent Timer 202. An operator will typically adjust Main Panel Percent Timer 202 to adjust the average speed of the last tower of the center pivot with a value between 0% and 100%. Those familiar with the an understand that the percent value set on Main Panel Percent Timer 202 reflects the percentage of time of a given period that Main Panel Percent Timer 202 outputs a voltage to signal that the center pivot should be moving. In some situations, a center pivot may be configured with a continuous move system and the percent timer value adjusts the rate of movement.

The output of Main Panel Percent Timer 202 is transmitted along the length of the center pivot to End Tower 16, shown on Figure, with Percent Timer Wire 204. At End Tower 16 there is located Pivot Monitor 206 that includes Application Processor 208 and Speed Control Relay 210. Application Processor 208 includes programming instructions that allow Pivot Monitor 208 to control Speed Control Relay 210 to adjust the speed of travel of the system. Application Processor 208 may include a memory table that includes speed zone start, speed zone end, and speed zone rate to select the current speed of travel based on the position of the system.

Figure 3:
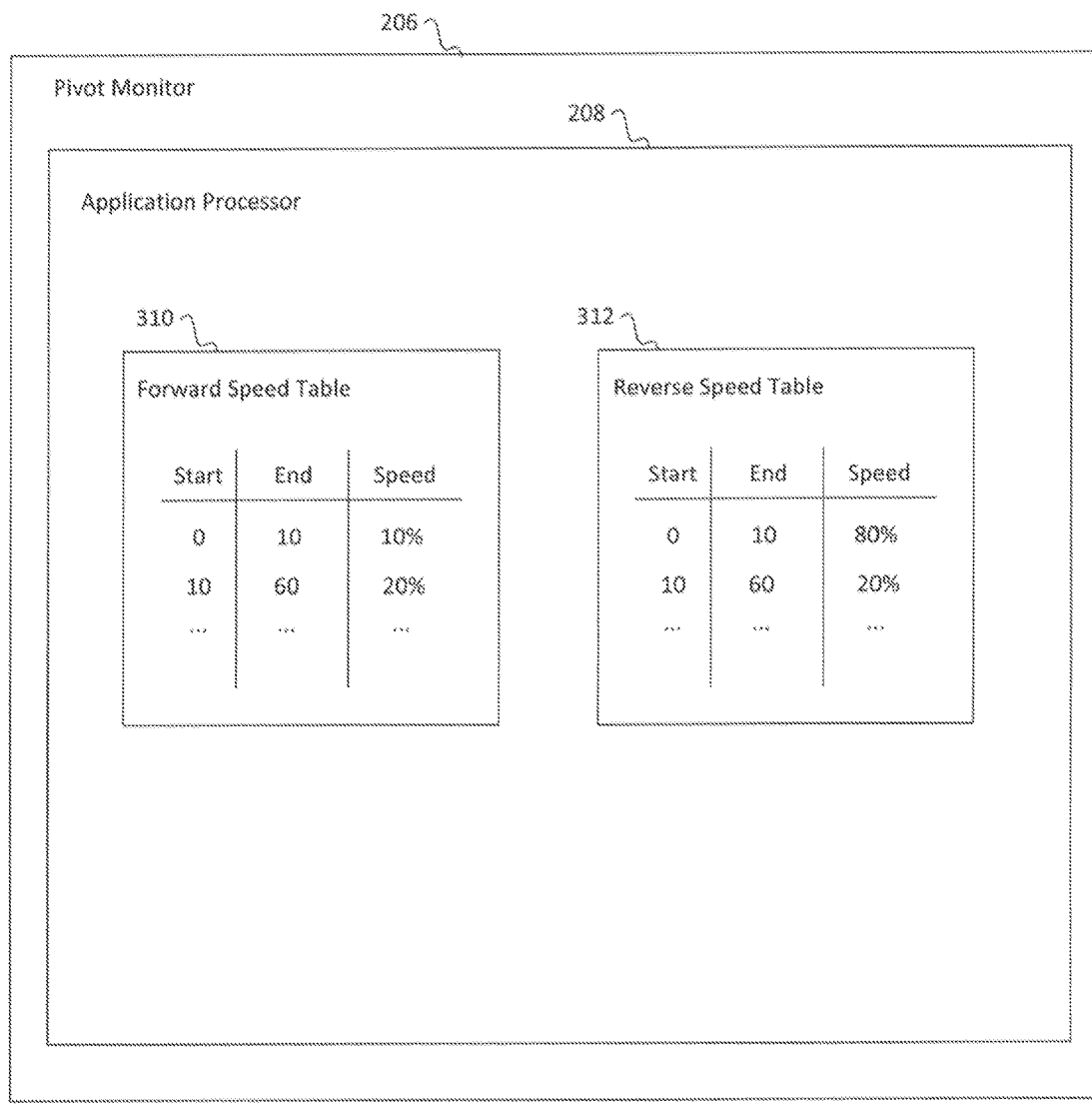
FIG. 3 depicts a prior art block diagram for a pivot controller for implementing different approach and exit speeds at a field edge.

With referenced now to FIG. 3, a prior art block diagram for a pivot controller for implementing different approach and exit speeds at a field edge is depicted. Application Processor 208 comprises Forward Speed Table 310 and Reverse Speed Table 312.

While travelling in the forward direction, Pivot Monitor 206 utilizes the speed settings contained in Forward Speed Table 310. Similarly, while travelling in the reverse direction. Pivot Monitor 206 utilizes the speed settings contained in the Reverse Speed Table 312.

Both Forward Speed Table 310 and Reverse Speed Table 312 contain rows including a Start Bearing, End Bearing, and Speed setting for locations on the field. The Start Bearing and End Bearing define a sector of the field between those bearings to apply the specified speed. Those skilled in the art will readily acknowledge that Forward Speed Table 310 and Reverse Speed Table 312 may contain several hundred rows of information and take up considerable memory in Application Processor 208.

Figure 4:
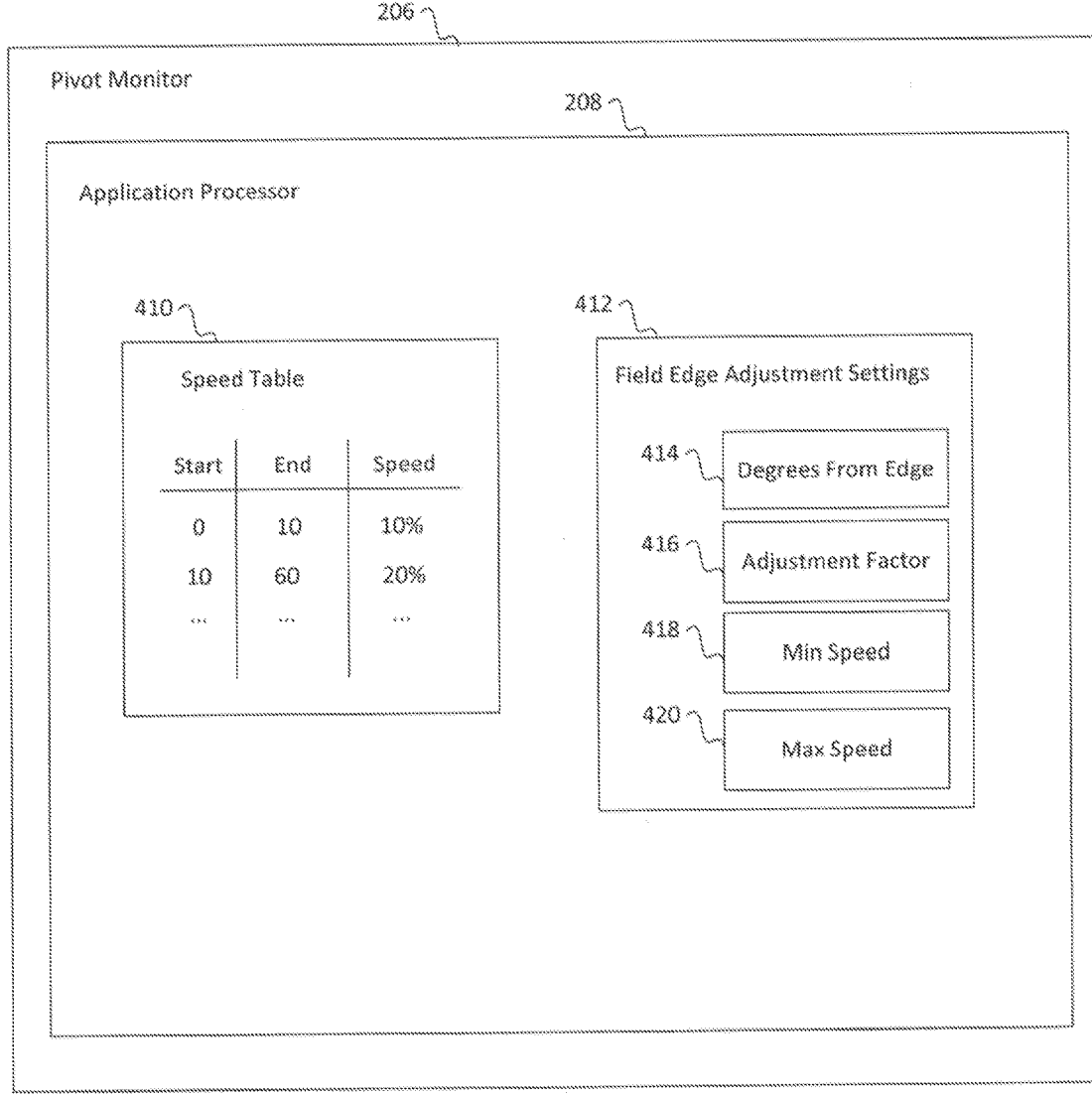
FIG. 4 illustrates an example block diagram of one embodiment of an improved pivot controller in accordance with the present invention.

With referenced now to FIG. 4, an example block diagram of one embodiment of an improved pivot controller in accordance with the present invention is illustrated. Unlike the prior art Application Processor 208 does not require a speed table for each direction to implement different approach and exit speeds at the field edge. Instead a preferred embodiment utilizes Speed Table 410 and Field Edge Adjustment Settings 412 to execute different approach speeds.

Speed Table 410 is similar to forward Speed Table 310 and Reverse Speed Table 312. Speed Table 410 contains a start bearing, end bearing, and speed for different areas of the field. Unlike the prior art speed tables, Speed Table 410 contains the desired pivot speed without any compensation for varying the approach or exit speeds at the field edge. Those skilled in the art will readily accept that Speed Table 410 may be implemented in a number of ways without departing from the scope or spirit of the present invention. The speed of a pivot may be specified in multiple ways, including percent timer duty or application rate.

Field Edge Adjust Settings 412 comprises Degrees from Edge (DFE) 414, Adjustment Factor 416, Minimum Speed 418, and Maximum Speed 420. In a preferred embodiment, Adjustment Factor 416 is specified as a field edge ratio that defines the percent of water to apply on the exit part of travel. In an alternative embodiment, Adjustment Factor 416 is specified as a field edge ratio that defines the percent of water to apply on the approach part of travel.

Minimum Speed 418 setting defines the minimum speed or maximum application rate that may be utilized when adjusting the speed of the pivot. Maximum Speed 420 setting defines the maximum speed or minimum application rate that may be utilized when adjusting the speed of the pivot. As a pivot speed is increased, the amount or water, or application rate, decreases. In an alternative embodiment, the present invention may be practiced without utilizing Minimum Speed 418 or Maximum Speed 420. In such case the rate of travel of the pivot would be limited by the physical and electrical limits of the center pivot.

In an alternative embodiment, there is a field adjustment setting for each edge of the field and the operator may define multiple field edges.

Figure 5:
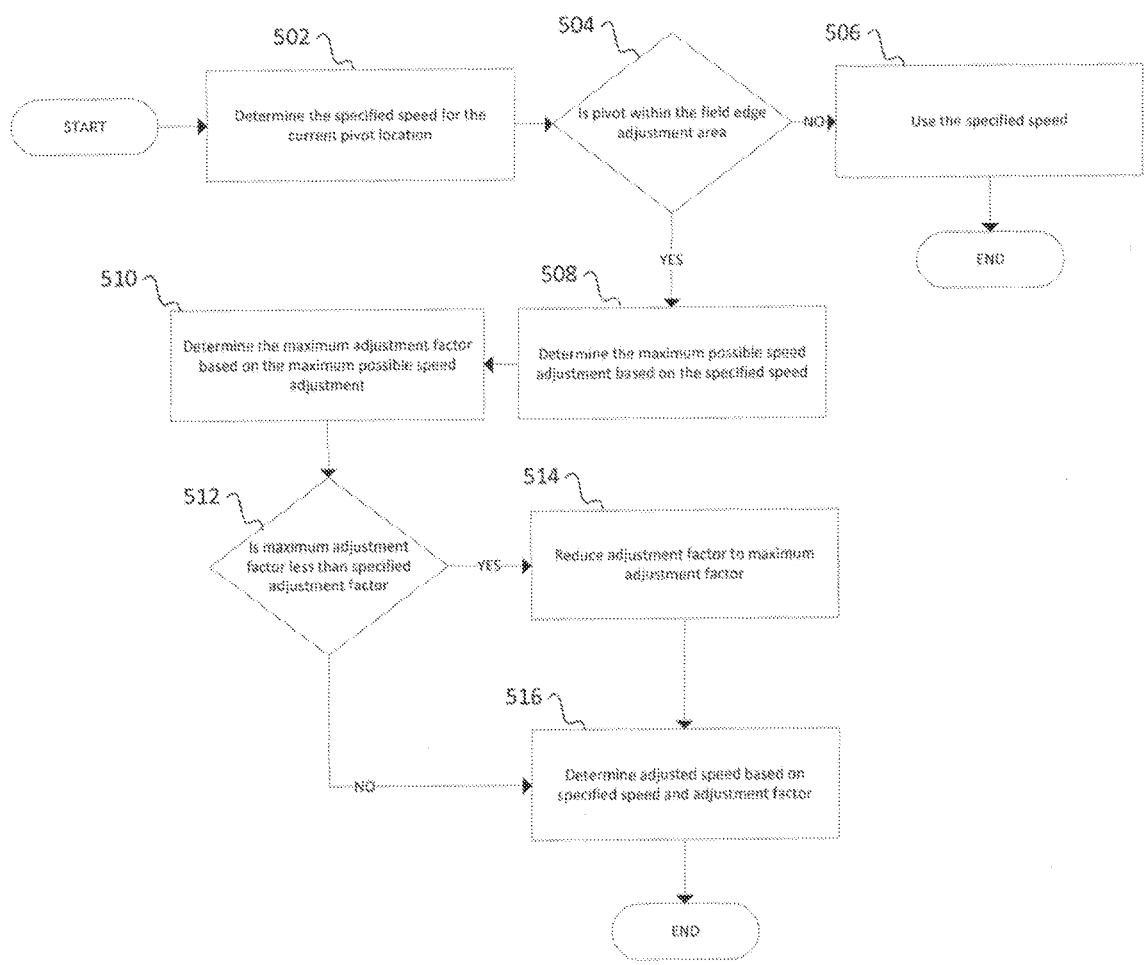
FIG. 5 depicts a flow chart of one embodiment for implementing different approach and exit speeds at a field edge in accordance with the present invention.

With referenced now to FIG. 5, a flow chart, of one embodiment for implementing different approach and exit speeds at a field edge in accordance with the present invention is shown.

The process begins at Step 502 to determine the specified speed tor the current location of the center pivot. The specified speed may be from a speed table or from a fix speed specified by the operator.

After determining the specified speed, the process moves to Step 504 to determine if the current pivot position is within a field adjustment area. To determine if the current position is within an adjustment area, the current position is compared to the field edges. If the current position is within the Degrees From Edge (DFE) setting, the pivot is considered to be within the field adjustment area. In an alternative embodiment, the DFE setting can express a distance instead of an angle to define the area of the field that speed adjustment is desired.

If the pivot is not within a field adjustment area, the process moves to Step 506 wherein the unmodified specified speed is utilized and the process ends.

If the pivot is within a field adjustment area, the process moves to Step 508 to determine the maximum possible speed adjustment ($PCT_{\Delta max}$) based on the specified speed.

$$PCT_{\Delta max} = \text{minimum } \{(\text{MAXSPEED}-\text{SPEED}), (\text{SPEED}-\text{MINSPEED})\}$$

Where MAXSPEED is the maximum allowed speed; MINSPEED is the minimum allowed speed; and SPEED is the specified speed for the current position.

After determining $PCT_{\Delta max}$, the process moves to Step 510 to determine the maximum adjustment factor $AF_{max}$.

$$AF_{max} = 1 - \{(\text{SPEED}-PCT_{\Delta max})/(2 \times \text{SPEED})\}$$

After determining $AF_{max}$ the process moves to Step 512 to compare the specified adjustment factor with the maximum adjustment factor. If the specified adjustment factor is less than $AF_{max}$ then the process moves to Step 516. Otherwise, the process moves to Step 514.

In Step 514, the specified adjustment factor is reduced to $AF_{max}$ to ensure that the resulting speed is within the limits of the pivot. The process then moves to Step 516.

In Step 516 the adjusted speed of the pivot is determined based on the specified adjustment factor and if the pivot is approaching or exiting the field edge.

$$SPD_{approach} = (1-\text{ADJUST}) \times (2 \times \text{SPEED})$$

$$SPD_{exit} = (\text{ADJUST}) \times (2 \times \text{SPEED})$$

where ADJUST is the adjustment factor.

The total amount of applied water over the adjustment zone will equal the amount that would have been applied had no adjustment taken place. However, the amount of water applied during the approach and the exit is distributed based on the adjustment factor. The effective result is that the user can obtain a desirable field edge behavior without the need for a separate speed table for each direction.

In the described embodiment the speed of the pivot has been described as the percent timer value used to control the speed of the center pivot and the adjustment factor is the percent of water to apply while exiting the field edge. Those skilled in the art will recognize that the speed may be describe as an application rate and the adjustment factor may be any number of value representations that describe the relationship of water being applied on approach and on exit without departing from the spirit and scope of the present invention.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. A pivot controller for implementing an approach speed and an exit speed at a field edge of a center pivot, said pivot controller comprising:
    a specified speed setting;
    a field adjustment settings for determining the approach speed and the exit speed at the field edge; and
    an application processor with memory for storing said specified speed and said field adjustment settings.

2. The pivot controller of claim 1, wherein said field adjustment settings comprise:
    a distance from edge setting; and
    an adjustment factor.

3. The pivot controller of claim 2, wherein said field adjustment settings further comprise:
    a minimum speed setting; and
    a maximum speed setting.

4. The pivot controller of claim 1, wherein said application processor comprises:
    instructions for determining if said center pivot is located within an adjustment zone;
    instructions for determining said approach speed; and
    instructions for determining said exit speed.

5. The pivot controller of claim 4, wherein instructions for determining said approach speed comprise:
    instructions for determining a maximum adjustment factor based on said specified speed;
    instructions for limiting said field adjustment settings based on the maximum adjustment factor.

6. The pivot controller of claim 1, wherein the specified speed setting is a constant speed for an entire field.

7. The pivot controller of claim 1, wherein the specified speed setting is from a speed table comprising two or more speed settings for different areas of a field.

8. The pivot controller of claim 2, wherein said adjustment factor represents a percentage for a total amount of water to be applied that is distributed between said approach speed and said exit speed.

\* \* \* \* \*